US011925910B2

(12) United States Patent
Appleton et al.

(10) Patent No.: US 11,925,910 B2
(45) Date of Patent: Mar. 12, 2024

(54) APPARATUS AND METHOD FOR MAKING VARIABLE DENSITY FOAM FLUID SYSTEMS

(71) Applicant: RheoVest, LLC, Shreveport, LA (US)

(72) Inventors: Eric Appleton, Shreveport, LA (US); Clayton Massett, Shreveport, LA (US); Nathan R. Hutchings, Shreveport, LA (US)

(73) Assignee: RheoVest, LLC, Shreveport, LA (US)

(*) Notice: Subject to any disclaimer, the term of this patent is extended or adjusted under 35 U.S.C. 154(b) by 0 days.

(21) Appl. No.: 18/301,436

(22) Filed: Apr. 17, 2023

(65) Prior Publication Data

US 2023/0249141 A1 Aug. 10, 2023

Related U.S. Application Data

(62) Division of application No. 17/066,892, filed on Oct. 9, 2020, now Pat. No. 11,697,098.

(51) Int. Cl.

| | |
|---|---|
| ***E21B 43/26*** | (2006.01) |
| ***B01F 25/31*** | (2022.01) |
| ***B01F 25/312*** | (2022.01) |
| ***E21B 21/14*** | (2006.01) |

(52) U.S. Cl.

CPC ...... *B01F 25/3111* (2022.01); *B01F 25/3123* (2022.01); *E21B 21/14* (2013.01); *E21B 43/26* (2013.01); *B01F 25/31253* (2022.01)

(58) Field of Classification Search

None

See application file for complete search history.

(56) References Cited

U.S. PATENT DOCUMENTS

| | | | | |
|---|---|---|---|---|
| 4,457,375 | A | 7/1984 | Cummins | |
| 4,474,680 | A * | 10/1984 | Kroll | B01F 35/56 261/DIG. 26 |
| 5,382,389 | A * | 1/1995 | Goodine | B01F 25/31112 261/78.2 |
| 2002/0003174 | A1 | 1/2002 | Jones et al. | |
| 2012/0325853 | A1 | 12/2012 | Harris et al. | |
| 2017/0225176 | A1 | 8/2017 | Menne et al. | |

OTHER PUBLICATIONS

International Search Report and Written Opinion, International Application No. PCT/US2021/051335 dated Jan. 18, 2022.

* cited by examiner

*Primary Examiner* — Charles R Nold
(74) *Attorney, Agent, or Firm* — Richard A. Fagin

(57) ABSTRACT

An apparatus for continuously generating and controlling the density of foam has a fluid in-flow manifold in communication with a source of liquid and comprising a pressure sensor. A plurality of branch lines are in fluid communication with the in-flow manifold a foam out-flow manifold. Each branch line has a flow control valve, a Venturi tube and in fluid communication with a throat of each Venturi tube an air induction control valve. The foam out-flow manifold has a pressure sensor. At least one in-flow control valve is disposed between the source and the in-flow manifold and at least one out-flow control valve is in communication with the out-flow manifold. The branch valves, air valves, the in-flow control valve and the out-flow control valve are operable to provide a chosen flow rate of the liquid and a selected foam product flow rate at a selected density of the foam product.

7 Claims, 6 Drawing Sheets

6. Branch Line
7. Branch Line Flow Control Valve
8. Venturi Tube
8A. Venturi Housing
8B. In-Flow Manifold Connection
8C. Out-Flow Manifold Connection
8D. Venturi Throat
8E. Venturi Outlet
8F. Venturi Inlet
9. Air Induction Line
10. Air Induction Control Valve
11. Check Valve / Back Flow Preventer
18. Controller Figure 3. Single 2" x 0.5" Venturi Calibration
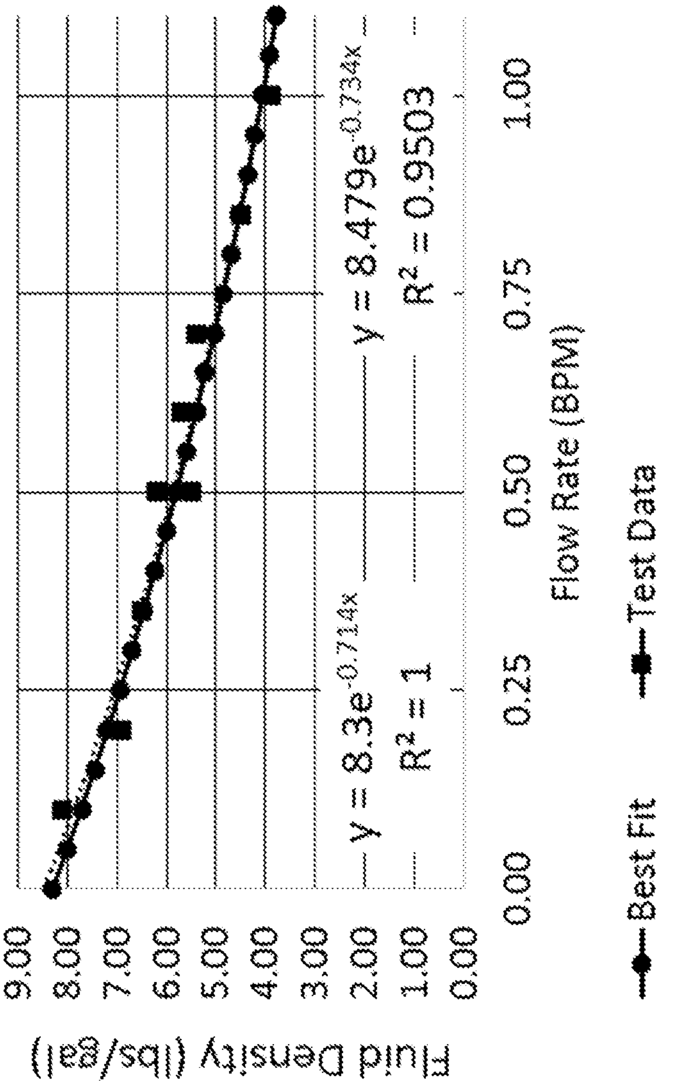

FIG 4. Example Apparatus Configurations with 6, 2" x 0.5" Venturi's

| | | | | | |
|---|---|---|---|---|---|
| Venturi Inlet ID" | 1.5 | Fluid Density (D) | 8.3 | In/Out Dif. Pressure (PSI) | 45 |
| Venturi Thread ID" | 0.44 | Calibration Factor (V) | -0.714 | Max Single Vent. Flow Rate (Q) | 1.03 |
| | | | | Min Density, (A/B =1) | 4.0 |

*Opening an Air Valve Assumes Manifold Valve is Also Open

| | Valve Positions<br>X = CLOSED<br>O = OPEN | Branch Line Number 1 | 2 | 3 | 4 | 5 | 6 | Valves | Flow Rate (Q, BPM)<br>Expected Density (T, lbs/gal) | | | | | |
|---|---|---|---|---|---|---|---|---|---|---|---|---|---|---|
| Example 1 | AIR (A) | X | X | X | X | X | O | 1 | Q = | 0.1 | 0.2 | 0.3 | 0.4 | 0.5 |
| | Branch Line (B) | X | X | X | X | X | O | 1 | T = | 7.7 | 7.2 | 6.7 | 6.2 | 5.8 |
| Example 2 | AIR (A) | X | X | X | X | X | O | 1 | Q = | 0.6 | 0.7 | 0.8 | 0.9 | 1.0 |
| | Branch Line (B) | X | X | X | X | O | O | 2 | T = | 7.5 | 7.3 | 7.2 | 7.1 | 6.9 |
| Example 3 | AIR (A) | X | X | X | X | O | O | 2 | Q = | 1.1 | 1.2 | 1.3 | 1.4 | 1.5 |
| | Branch Line (B) | X | X | X | X | O | O | 2 | T = | 5.6 | 5.4 | 5.2 | 5.0 | 4.9 |
| Example 4 | AIR (A) | X | X | X | X | X | O | 1 | Q = | 1.6 | 1.7 | 1.8 | 1.9 | 2.0 |
| | Branch Line (B) | X | X | X | O | O | O | 3 | T = | 7.3 | 7.3 | 7.2 | 7.1 | 7.1 |
| Example 5 | AIR (A) | X | X | X | X | O | O | 2 | Q = | 2.1 | 2.2 | 2.3 | 2.4 | 2.5 |
| | Branch Line (B) | X | X | X | O | O | O | 3 | T = | 5.9 | 5.9 | 5.8 | 5.7 | 5.6 |
| Example 6 | AIR (A) | X | X | X | X | O | O | 2 | Q = | 2.6 | 2.7 | 2.8 | 2.9 | 3.0 |
| | Branch Line (B) | X | X | X | O | O | O | 3 | T = | 5.5 | 5.4 | 5.3 | 5.2 | 5.2 |
| Example 7 | AIR (A) | X | X | X | X | O | O | 2 | Q = | 3.1 | 3.2 | 3.3 | 3.4 | 3.5 |
| | Branch Line (B) | x | X | O | O | O | O | 4 | T = | 6.3 | 6.2 | 6.2 | 6.1 | 6.1 |
| Example 8 | AIR (A) | X | X | X | O | O | O | 3 | Q = | 3.6 | 3.7 | 3.8 | 3.9 | 4.0 |
| | Branch Line (B) | X | X | O | O | O | O | 4 | T = | 5.1 | 5.1 | 5.0 | 4.9 | 4.9 |
| Example 9 | AIR (A) | X | X | O | O | O | O | 4 | Q = | 4.1 | 4.2 | 4.3 | 4.4 | 4.5 |
| | Branch Line (B) | X | O | O | O | O | O | 5 | T = | 5.2 | 5.1 | 5.1 | 5.0 | 5.0 |
| Example 10 | AIR (A) | X | X | X | O | O | O | 3 | Q = | 4.6 | 4.7 | 4.8 | 4.9 | 5.0 |
| | Branch Line (B) | X | O | O | O | O | O | 5 | T = | 5.6 | 5.5 | 5.5 | 5.5 | 5.4 |
| Example 11 | AIR (A) | X | X | X | X | O | O | 2 | Q = | 5.1 | 5.2 | 5.3 | 5.4 | 5.5 |
| | Branch Line (B) | X | O | O | O | O | O | 5 | T = | 6.2 | 6.2 | 6.1 | 6.1 | 6.1 |

APPARATUS AND METHOD FOR MAKING VARIABLE DENSITY FOAM FLUID SYSTEMS

CROSS REFERENCE TO RELATED APPLICATIONS

Divisional of U.S. application Ser. No. 17/066,892 filed on Oct. 9, 2020 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of foam fluid systems. More specifically, the disclosure relates to methods and apparatus for generating foamed fluids.

Foam fluid systems have a wide range of uses in oil and gas well drilling and well completions, as well as trenchless boring, among other uses. Such uses in well drilling and completion, and trenchless boring, may be particularly valuable when operations are performed in unconsolidated and/or highly permeable soil conditions, such as sand and when subsurface reservoir pressures are low. Foam fluid systems have the primary advantage of reducing the hydrostatic pressure on a permeable geological formation exposed by a well, thereby reducing the amount of fluid lost to the formation and increasing the amount of fluid being circulated in the annulus (an annular space, e.g., between a drill pipe and the formation or the space between a tubing string and well casing). Conventional (unstabilized) foam systems can be made by mixing at least one of many well-known foaming surfactants with a base fluid, which may or may not have other fluid additives to convey additional beneficial properties to the fluid system. Unstabilized foams are generally quick to break down when depressurized as a result of rapid expansion and coalescence of the entrained gas bubbles but such foams are often sufficient for an application where reduction in hydrostatic pressure and increased circulation rates are the primary objective.

The rheological behavior of stabilized foam fluid systems is often preferable to that of unstabilized foams, particularly in well drilling and post-fracture treatment completions, due to the increased drill cuttings carrying capacity, natural filtration (leak-off) control, reduced hydrostatic pressure on the subsurface reservoir or formation, and stability while circulating the foam through a well annulus. Generally, stabilized foam fluid systems can be made from a variety of well-known polymeric gelling agents mixed with any one or more well-known surfactants to form extremely stable gas-fluid emulsions, which may have additional fluid additives incorporated therein to provide specific properties to the stabilized foam fluid systems. The stability of the resulting foam is dependent on the specific dosage ratios of certain fluid system additives, and the quality of the foam is dependent on the ratio of liquid to gas in the emulsion (and corresponding foam density). In methods known in the art, foamed fluid systems have been made by either injecting the gas into a base fluid mixture at a specified rate using a compressor that can overcome the fluid line pressure, or by batch mixing the base fluid mixture and surfactants into an aerated tank system until the desired foam quality and fluid density are obtained. Such known methods may require expensive, high pressure equipment such a screw compressor or injection unit. Quality checking the foam prior to delivery into a subsurface well or other point of use may very difficult. The latter method is time consuming and inefficient as each batch of fluid must be aerated until the target foam density is achieved, and quality adjustments may be difficult in such cases when large batches of foam are being made. Thus, a system for creating foam fluid systems with on-the-fly fluid density control without expensive injection equipment and with rapid quality control and foam property adjustments would be more economical and more efficient than systems and practices known in the art.

SUMMARY

One aspect of the present disclosure relates to an apparatus for creating, and in some embodiments, continuously controlling the density of a foam fluid system. An apparatus according to this aspect of the disclosure has a fluid in-flow manifold, in some embodiments comprising an in-flow pipe. Some embodiments may comprise a pressure sensor and flow meter connected to the in-flow pipe, and in communication with a source of liquid. A plurality of branch lines are in fluid communication with the in-flow manifold and with a foam out-flow manifold. Each branch line has a flow control valve, a Venturi tube and is in fluid communication with a throat of each Venturi tube and an air induction control valve connected thereto. The foam out-flow manifold has a foam discharge pipe, a pressure sensor, a sample port, and in some embodiments may also contain an in-line screen or static mixer to homogenize the fluid mixture. At least one in-flow control valve is disposed between the source and the in-flow manifold and at least one out-flow control valve is in communication with the out-flow manifold. The branch line control valves, air induction control valves, the in-flow control valve and the out-flow control valve are operable to provide a chosen flow rate or differential pressure of the in-flow liquid and a selected out-flow foam product flow rate at a selected density of the foam product.

In some embodiments, each Venturi tube is disposed in a housing such that the Venturi tube is replaceable.

In some embodiments, at least one Venturi tube has at least one of a different inlet diameter, a different throat diameter and a different outlet diameter than at least one other Venturi tube.

In some embodiments, a number of the plurality of branch lines is between two and ten.

In some embodiments, a number of the plurality of branch lines is determined by dividing a maximum expected flow rate for the apparatus by a maximum obtainable flow rate per branch line based on the specifics of the application.

In some embodiments, the number of branch lines is six.

In some embodiments, the branch line flow control valve on each branch line, the air induction control valve on each branch line, the at least one in-flow control valve and the at least one out-flow control valve comprise variable flow restriction valves.

Some embodiments further comprise a check valve in an air induction line coupled to each air induction control valve.

In some embodiments, a static mixer, screen, or other in-pipe fluid homogenizing device is located before or after the at least one out-flow control valve.

In some embodiments, a sample port comprising a stem and valve is located after the foam discharge control valve to enable samples to be collected for QA/QC of the fluid properties.

In some embodiments, a mass flow meter, or other in-line device capable of measuring a parameter related to density, is located after the foam discharge control valve to measure or calculate the out-flow foam fluid density.

A method for generating foam from a liquid according to another aspect of the disclosure includes moving a liquid to be converted into foam into a plurality of commonly connected Venturi tubes. A flow restriction into each of the plurality of Venturi tubes and a flow restriction to air entering a throat of each of the plurality of Venturi tubes are controlled such that a liquid-air mixture forms a foam that is discharged from the Venturi tubes at a selected density.

In some embodiments, the controlling of the flow restriction comprises selecting a number of the plurality of Venturi tubes and a number of the throats open to flow to obtain a target foamed fluid density, a process that can be manual or automated by a control device.

In some embodiments, the controlling flow restriction comprises varying an amount the flow restriction.

In some embodiments, the base fluid comprises fresh water, brine, or mixtures thereof, including oil field produced water, wastewater, or reclaimed or repurposed water.

In some embodiments, the liquid comprises a base fluid and at least one foaming surfactant.

In some embodiments, the at least one foaming surfactant comprises an anionic, cationic, or nonionic surfactant such as: Sodium Dodecyl Benzene Sulfonate, Sodium dodecylsulfate, Sodium laurate, Sodium lauryl sulfate, Hexadecyl sulfonic acid, Hexadecyl trimethylammonium bromide, Cetyltrimethyl ammonium chloride, Cetyltrimethyl ammonium bromide, Dodecyl pyridinium Chloride, Sodium dioctyl sulphosuccinate, Dodecylamine hydrochloride, Polyoxyethylene monohedadecyl ether, polyethylene oxide-propylene oxide block polymers, ethoxylated alcohols, or amine oxides.

In some embodiments, the liquid comprises a base fluid and at least one viscosifying agent, and at least one foaming surfactant.

In some embodiments, the at least one foaming surfactant is selected from the list above based on compatibility with the at least one viscosifying agent that is comprised of a biopolymer, modified biopolymer, synthetic polymer, or swelling clay such as: xanthan gum, guar gum, hydroxyethyl cellulose, carboxymethyl cellulose, carboxymethyl-hydroxypropyl guar, sodium/potassium/calcium/ammonium alginate, partially hydrolyzed polyacrylamide, acrylic acid copolymers, acrylamide-dimethylacrylamide mixtures, 2-acrylamido-2-methyl-propane sulfonic acid, starches, styrene-ethylene copolymers, smectite clays like bentonite, or palygorskite-sepiolite clays like attapulgite, wellan gums, or gellan gums.

In some embodiments, the base fluid liquid comprises fresh water or recirculated well fluids containing 0.5 to 3.25 pounds per barrel of xanthan gum, preferably 1.25 to 2.5 lbs/bbl and 0.1 to 0.75 pounds per barrel of sodium dodecyl benzene sulfonate, preferably 0.2 to 0.4 lbs/bbl.

In some embodiments, an amount of at least one viscosifying agent is selected based on a selected viscosity of the fluid system, and an amount of at least one surfactant is selected based on the selected foam density.

In some embodiments, a pressure of the moved liquid into the in-flow manifold and a pressure of foam discharged from the out-flow manifold has a selected differential across the apparatus.

In some embodiments, the selected foam density is between 100% and 45% of the base fluid liquid density.

In some embodiments, the foam density is selected between 8.3 and 3.7 pounds per gallon.

In some embodiments, the foam is moved into a subsurface well or bore hole, circulated through the subsurface well or bore hole and returned to surface.

In some embodiments, the moving liquid and controlling flow restriction is performed continuously during operations on the subsurface well or bore hole.

Other aspects and possible advantages will be apparent from the description and claims that follow.

BRIEF DESCRIPTION OF THE DRAWINGS

FIG. 3 shows an example calibration graph for a branch line of outlet foam density with respect to liquid flow rate.

FIG. 4 shows foam density for various valve configurations using the apparatus shown in FIG. 1 and the calibration example in FIG. 3.

DETAILED DESCRIPTION

Figure 1:
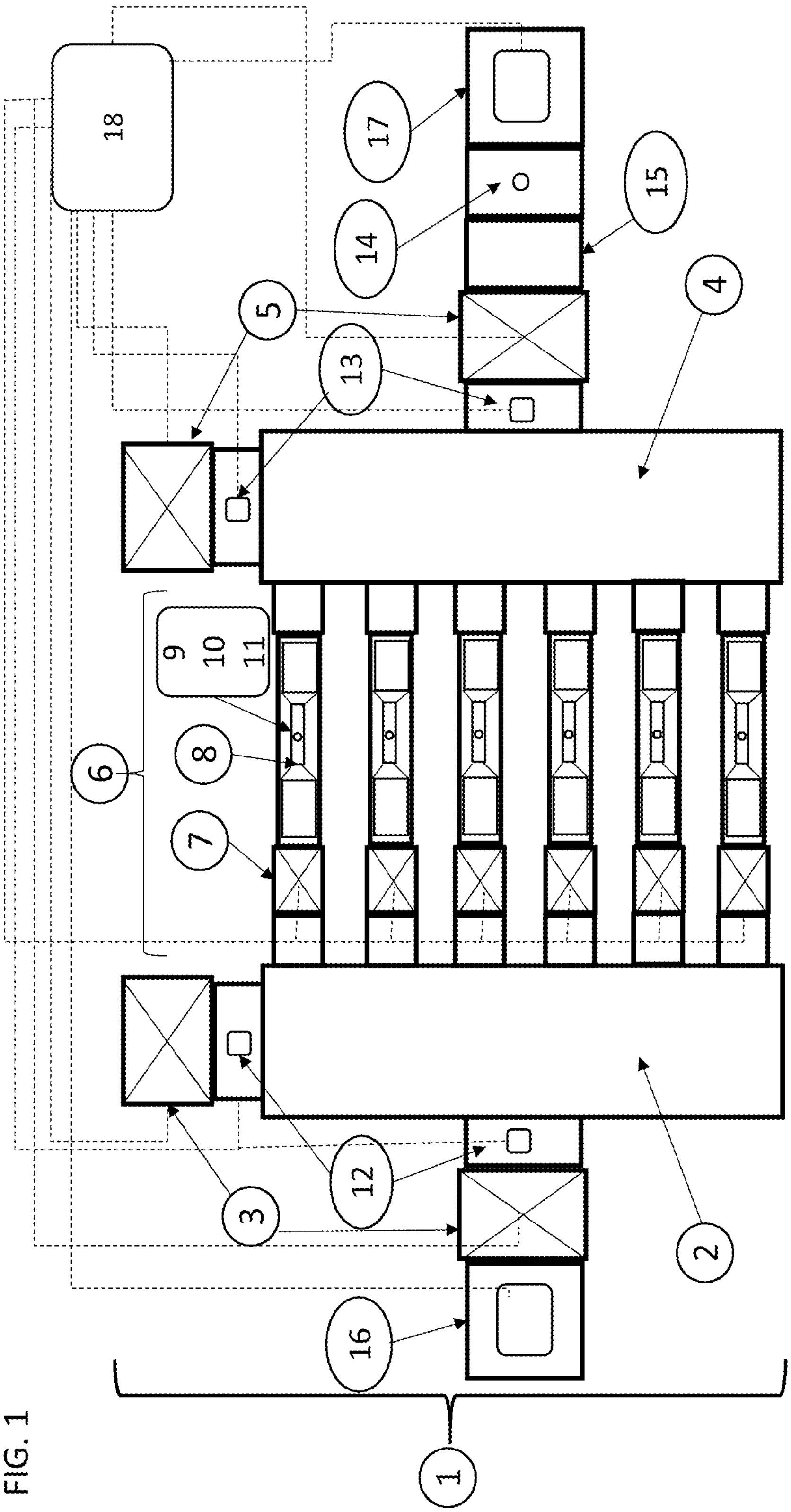
FIG. 1 shows a schematic diagram of an example apparatus according to the present disclosure.

FIG. 1 shows an example embodiment of a stabilized foam fluid generating apparatus having foam density control features. The apparatus [1] may comprise a liquid in-flow manifold [2] having one or more, in the present example embodiment, two liquid in-flow control valves [3]. Either or both of the liquid in-flow manifold control values [3] may be in pressure communication with an inlet pressure sensor [12] and flow meter [16] as will be explained further below. The liquid in-flow manifold [2] may be connected to a plurality, e.g., six in the present embodiment, of mixing branch lines [6] connected to a foam out-flow manifold [4]. Either or both of the foam out-flow manifold control valves [5] may be in pressure communication with an outlet pressure sensor [13], an out-flow sample port [14], an in-line mixer [15], and an out-flow flow meter [17] as will be further explained. The foam out-flow manifold [4] may comprise one or more, in the present example embodiment, two out-flow control valves [5]. Each branch line [6] may comprise a branch line flow control valve [7] and a Venturi (air-induction) tube [8]. In the present example embodiment, the Venturi tube [8] may comprise a replaceable tube disposed in a housing, wherein the housing forms the fluid connection between the branch line flow control valve [7] and the foam out-flow manifold [4]. Such feature will be further explained with reference to FIG. 2. The number of in-flow control valves [3], out-flow control valves [5] and mixing branch lines [6] is a matter of discretion for the system designer and may be different from what is shown in FIG. 1 to suit specific intended fluid flow rate and foam density ranges.

In some embodiments, some or all of the foregoing valves, flow meters, and the pressure sensors may be in signal communication with a controller [18]. The controller

[18] may be a microcontroller, microprocessor, programmable logic controller, floating programmable gate array, application specific integrated circuit or any other device that can automate operation of the valves in response to measurements made by the pressure sensors and any other sensors such as density sensors and flow rate sensors. In such embodiments, the valves may be automatically controlled to provide foam product at a selected density. The valves in such embodiments may be, for example, motor operated valves for variable flow restriction, or solenoid operated valves for open/closed operation.

A sample port [14] may be in fluid communication, as shown with a downstream side of either or both out-flow control valves [5] to facilitate sampling the produced foam for density verification and quality control purposes. A fluid homogenizing screen or in-line mixer [15] may be located before or after either or both the out-flow control valves [5] but before the sample port [14]. A flow meter [17], preferably a mass flow meter or other in-line device capable of measuring a parameter related to fluid density may be located after the sample port [14].

The in-flow control valves [3] may be ball valves, gate valves, butterfly valves or any other valve having a variable flow restriction, or the in-flow control valves [3] may be of a type to simply perform the function of opening and closing flow therethrough. Similarly, the out-flow control valves [5] and the branch line flow control valves [7] may be variable flow restriction or flow opening/closing valves.

Figure 2:
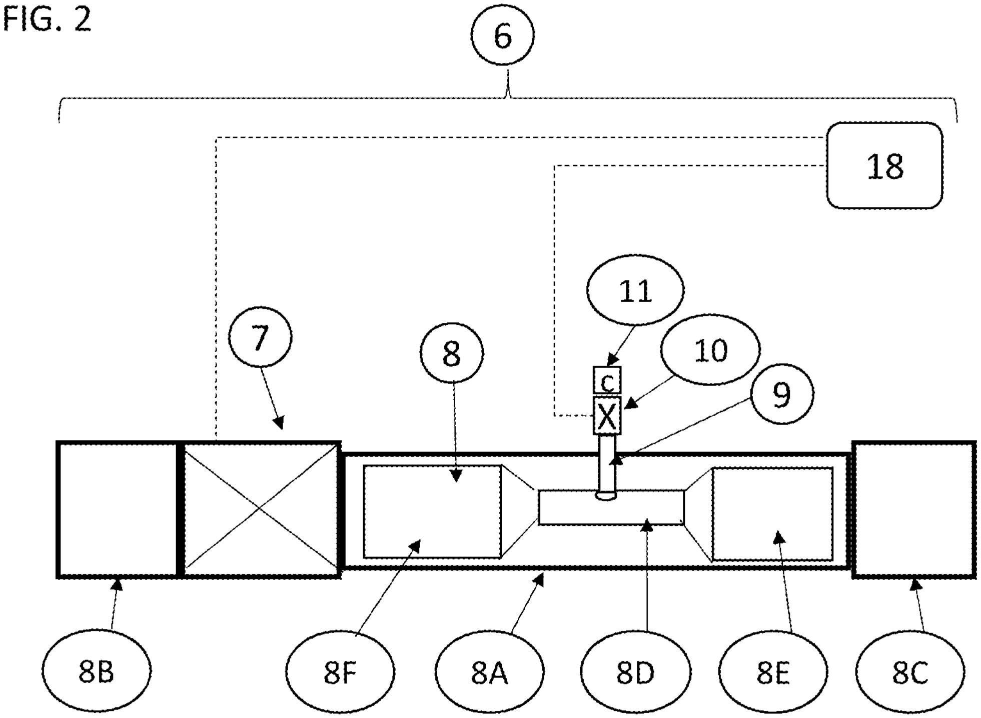
FIG. 2 shows a branch portion of the apparatus of FIG. 1.

FIG. 2 shows a more detailed view of one of the branch lines [6]. The branch line may comprise a fluid inlet connection [8B] to the in-flow manifold ([2] in FIG. 1), connected to the branch line flow control valve [7] which may having a control signal line connected to the controller [18]. The Venturi (air-induction) tube [8] may be disposed in a housing [8A] coupled at one end to the branch line flow control valve [7]. The Venturi tube [8] may have an inlet end [8F], tapered down in diameter to a throat [8D] and then tapered upward in diameter to an outlet end [8E]. The respective diameters of the inlet end [8F], throat [8D] and outlet end [8E] may be chosen for the expected flow rate through the branch line [6], and as explained above, one Venturi tube [8] may have different respective diameters than another to be inserted into the housing [8A] depending on the intended flow rate through the branch line [6]. An air-induction line [9] having an outlet in the low pressure region of the Venturi tube [8], i.e., the throat [8D], an air induction control valve [10] may be located at the upstream end of the air induction line [9], and a check valve/back-flow preventer [11] connected to the air control valve [10]. The air induction control valve [10] may be similar in type and function to any of the other valves described herein which may be operatively connected to the controller [18]. An outlet end [8C] of the housing [8A] may be fluid connected to the out-flow manifold ([4] in FIG. 2). In some embodiments, each of the plurality of branch lines [6] may be connected between the manifolds as explained herein. Any of the plurality of branch lines [6] may have the same or different respective diameter Venturi tubes [8] as any other of the plurality of branch lines [6]. In this way, an apparatus according to the present disclosure may be configured for a wide range of expected fluid flow rates while being able to have suitable air induction without the need for external compression to generate a wide range of foam densities consistent with the composition of the liquid input to the apparatus [1].

Referring once again to FIG. 1, the apparatus [1] may operate as follows. A fluid composition containing at least one viscosifier agent and at least one surfactant is introduced, e.g., pumped from a tank or tanks, into the in-flow manifold [2] through one or more of the in-flow control valves [3], for example, by a fluid pump. The fluid composition density may be measured by any well-known device such as a mud-scale, hydrometer, mass-flow meter, or other fluid density measurement device. For a target fluid composition flow rate for a specific use or purpose, the number of branch line flow control valves [7] and air-induction control valves [10] to be opened and to what fractional amount of opening, if applicable, may be determined by a Configuration Equation e.g., as in Eq. 1 below, that is based on the base fluid density (D) and the total flow rate through the apparatus (Q), a manifold flow balance based on the number of open branch lines (B), the number of open air induction control valves (A), a Venturi calibration factor (V) and (e) is the Euler Number Constant or natural logarithm base (approximately 2.718):

$$T = D\left[e^{\left(V\times\frac{Q}{B}\times\frac{A}{B}\right)}\right] \qquad \text{(Eq. 1)}$$

The Configuration Equation for each Venturi tube [8] within any particular embodiment of the apparatus [1] can be empirically determined with test fluids prior to the use in producing foam. The slope of a best fit line in a plot of the resultant fluid density of a fluid system at various flow rates (or differential pressures) with respect to the resultant fluid density obtained at each flow rate (or differential pressure) when passed through a single branch line [6] with a single open air-induction control valve [10] will provide the Venturi calibration factor (V) for the Configuration Equation as shown graphically in FIG. 3. Depending on the range of flow rates (or pressures) tested for the specific purpose, the Configuration Equation may be linear or exponential. Additionally, weighting coefficients may be applied to the terms (Q/A) and (A/B) in Eq. 1 to appropriately account for the fluid flow balance in a manifold configuration as in FIG. 1, and the sensitivity of the Venturi configuration as shown in FIG. 2, respectively.

Target flow rates and pressures can be controlled by adjusting either or both of the in-flow control valves [3] or the out-flow control valves [5], depending on the specific use and desired pressures across the in-flow [2] and out-flow [4] manifolds. Similarly, fine tuning the produced foam density can be obtained by controlling the relative opening of the air induction control valves [10] to adjust the amount of air induced into each Venturi tube [8] or by adjusting the relative opening of any of the branch line control valves [7].

FIG. 4 shows expected fluid density calculations for eleven example configurations of the apparatus in FIG. 1 and example Calibration Equation in Eq. 1 and FIG. 3, equipped with six, two-inch by half-inch Venturi tubes for an application with flow rate ranges from 0.5 barrels per minute (BPM) up to 5.5 BPM with 45 pounds per square inch (PSI) of differential pressure, explained further below, between the in-flow manifold [3] and the out-flow manifold [4]. Bernoulli's equation may be used to calculate the maximum flow through a single Venturi tube [8] at the designated differential pressure across the in-flow and out-flow manifolds, which may then be used to calculate the minimum expected foam product density generated through a single Venturi tube [8] based on Eq. 1. Examples 1 through 11 in FIG. 4 show how the foam product density is expected to change at various flow rates and the respective manifold configuration (i.e., the number of open branch line valves relative to the number of open air induction control valves [10]). For example, in a scenario where the foam product intended use requires a density of 5.9 lbs/gal (pounds per gallon) at 3.1 BPM (U.S. barrels per minute) flow rate, then Example 7, having four open branch lines with two open air induction valves may be expected generate a foam product density of 6.3 lbs/gal, and Example 8 having four open branch lines with three open air control valves may be expected to generate a foam product density of 5.5 lbs/gal. Therefore, to generate the desired foam product density of 5.9 lbs/gal, one possible configuration will comprise of four open branch lines with two air induction control valves fully open and a third air induction control valve approximately halfway open. Alternatively, the branch line control valves can also be adjusted in a similar fashion (e.g., partially opened or partially closed) to obtain the same resultant selected foam product density. It should be understood that operable configurations do not require both the air induction valve and the branch flow control valve both to be open on any one branch line for the apparatus to work according to the present disclosure. There may be circumstances where opened branch line control valves may not have corresponding opened air-induction control valves; however, for any air-induction control valve to function properly, the commensurate branch line control valve must be opened in order for the Venturi to induce air through that line, as illustrated in FIG. 4. Fluid flowing through opened branch lines without corresponding opened air-induction control valves will not have air induced into the flow through branch line; but such flow will recombine and mix with the flow from all of the open branch lines in the out-flow manifold and subsequent flow homogenizer to produce a homogenous foamed fluid prior to reaching the sample port.

In some embodiments, the liquid to be foamed comprises at least one viscosifying polymer, and at least one foaming surfactant. A base liquid having such constituents may be fresh water, brines, or combinations thereof. In some embodiments, the viscosifying polymer comprises xanthan gum and the at least one foaming surfactant comprises sodium dodecyl benzene sulfonate. In some embodiments, the selected density of the foam to be generated is between 100% and 45% of the in-flow liquid density. In some embodiments, the liquid to be foamed comprises fresh water containing 1.25 pounds per barrel of xanthan gum viscosifying polymer and 0.3 pounds per barrel of sodium dodecyl benzene sulfonate surfactant. In some embodiments, a pressure of the in-flow liquid and a pressure of foam product discharged from the Venturi tubes have a selected differential. In some embodiments, the selected foam density is selected between 8.3 and 3.7 pounds per gallon.

In some embodiments, the liquid comprises fresh water or recirculated well fluids containing 0.5 to 3.25 pounds per barrel of xanthan gum, preferably 1.25 to 2.5 lbs/bbl and 0.1 to 0.75 pounds per barrel of sodium dodecyl benzene sulfonate, preferably 0.2 to 0.4 lbs/bbl.

In some embodiments, an amount of at least one viscosifying agent is selected based on a selected viscosity of the fluid system, and an amount of at least one surfactant is selected based on the selected foam density.

In some embodiments, a pressure of the moved liquid into the in-flow manifold and a pressure of foam discharged from the out-flow manifold has a selected differential across the apparatus.

In some embodiments, the selected foam density is between 100% and 45% of the base fluid liquid density.

Measurements of pressure made by the pressure sensors [12], [13] may enable calculating a pressure drop across the apparatus [1]. The pressure drop may be used in combination with a rate of flow of liquid into the apparatus to enable adjusting any or all of the valves as explained above to obtain a selected foam product density and any chosen flow rate.

Figure 5:
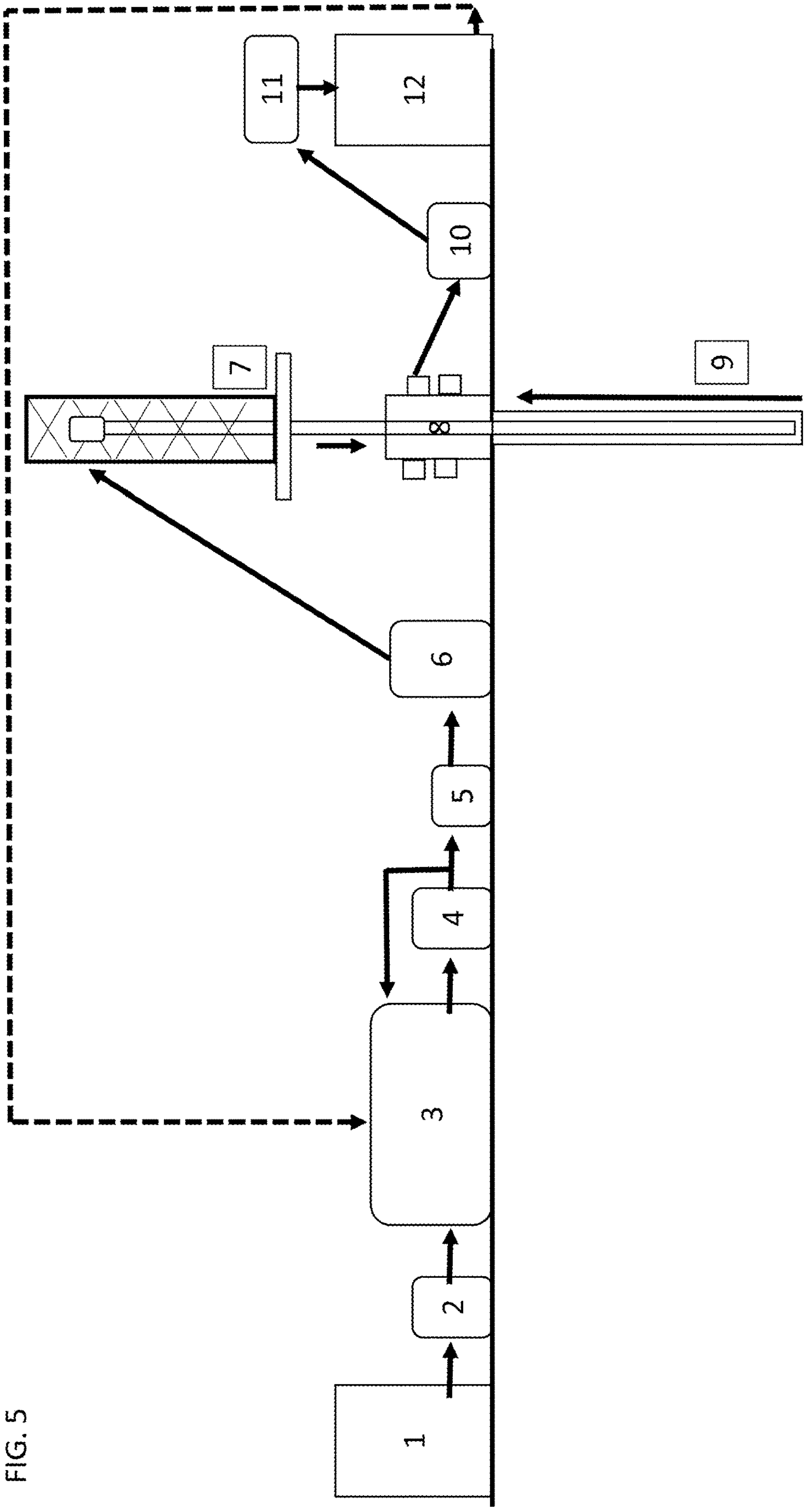
FIG. 5 shows an example embodiment of well intervention using an apparatus as in FIG. 1 and FIG. 2.

Referring to FIG. 5, in some uses of the apparatus (1 in FIG. 1) for example, in oil and gas well interventions, such as post-fracture treatment plug drill-outs, well clean outs, or well servicing work, the base fluid may be moved from a storage tank [51] or pond by a transfer pump [52] into a mixing tank [53], wherein the at least one viscosifying agent is added and hydrated by agitation. The resultant mixed fluid may be tested to verify the selected base fluid density and viscosity. The at least one surfactant may then be added to and mixed with the viscosified base fluid as it is pumped by another transfer pump [54] through the foam density control apparatus [1]. The apparatus [1] may be as explained with reference to FIGS. 1 and 2, wherein the various valves are configured to obtain the selected foam density. The out-flow foam density may be verified by taking sample(s) from the sample port. Foam product may be transferred to the intake of a downhole pump [56], for example a mud pump such as a drilling rig or workover rig mud pump. The downhole pump [56] boosts the foamed fluid pressure sufficiently to obtain the desired flow rate into a well. The pumped foam (fluid) circulates through a well service tubing string deployed in the well by a service unit or rig [57] and exits a bottom-hole tool assembly at the end of the well service tubing string. The well service tubing string may be jointed pipe, coiled tubing or any other conduit or conduit system known in the art for servicing wells. The fluid then circulates up the annulus [59] (between the well service tubing string and exposed formation or well casing as applicable) carrying debris from the wellbore back up to the surface, e.g., through a wellhead [58]. The pressure of the fluid traveling up the annulus [59] and out of the well conveys the fluid through a debris catcher, choke manifold, or other well control system [60] as may be applicable, where the fluid is then discharged into a return fluid tank [62]. Additional solids control apparatuses [61] may be used to separate any residual debris from the returned fluid. If the well pressure or return flow rate is insufficient to obtain the desired result, adjustments to the specified foam density can be made at the foam density control apparatus [1] to reduce the resulting fluid density and increase the well surface pressure and return flow rate, respectively. Conversely, if the well surface pressure becomes higher than desired as a result of higher than anticipated subsurface reservoir pressure, the specified foam density can be adjusted at the foam density control apparatus to increase the fluid density and consequently increase the hydrostatic pressure in the well to reduce the well surface pressure. The foamed fluid that returns from the well into the return fluid tank can be quality checked, and some of all of the return fluid can be transferred to the fluid mixing tanks for reconditioning and reuse. Return fluids that lack sufficient base fluid properties to be suitable for reuse may be segregated from the system and stored for disposal.

Figure 6:
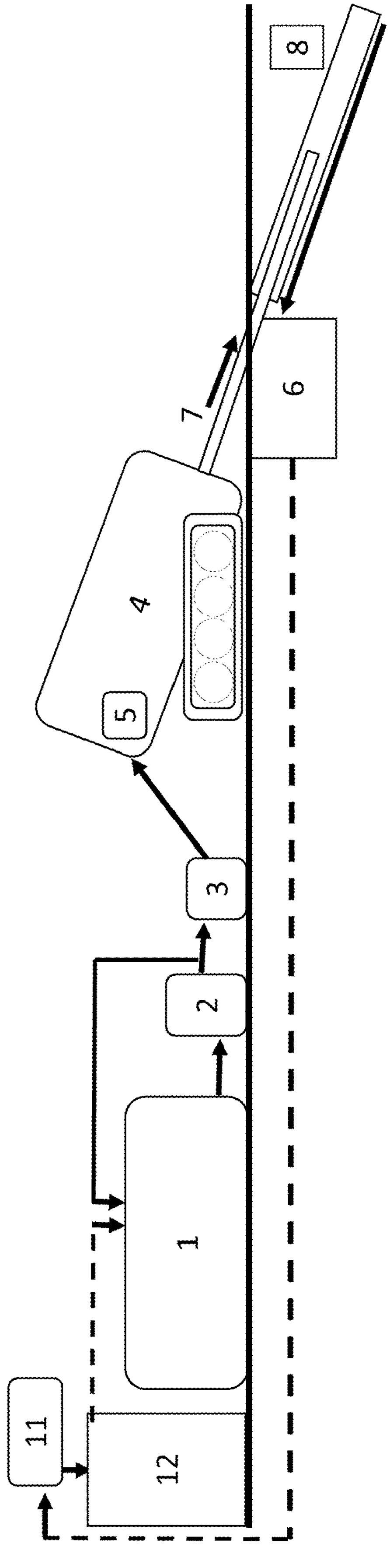
FIG. 6 shows an example embodiment of horizontal directional drilling or trenchless boring using an apparatus as in FIG. 1 and FIG. 2.

Referring to FIG. 6, in another example use for the apparatus [1] in horizontal directional drilling (e.g. trenchless boring) for bores through a variety of soil conditions including but not limited to either highly permeable, unconsolidated soils, such as sand, or for bores through soils with very large or high density cuttings, such as cobble or rocky soils, the base fluid may be stored or delivered to the bore site in a tank [71]. The at least one viscosifying agent is mixed into the base fluid and hydrated to obtain the desired base fluid viscosity. Just before being pumped by a transfer pump [72] through the foam density control apparatus [1], the at least one surfactant is added to the tank and briefly circulated sufficiently to mix the at least one surfactant with the viscous base fluid, but not excessively so as to prevent premature foaming of the mixture. A mixing pump (not shown) may then be used to pump the fluid mixture through the foam density control apparatus [1], as in FIGS. 1 and 2. The apparatus [1] has the valves as explained above configured to obtain the desired foam density based on the anticipated flow rate for the drill. Samples collected from the sample port are used to verify fluid density and rheological properties necessary to suspend drill cuttings from the soil. The fluid (mud) pump [75] on the drill [74] is used to pump the foamed fluid through the drill string [77] and bit (or reamer—not shown separately) at sufficient rates to facilitate boring through the soil. The foamed fluid exits the bit and returns up the annulus [78] and is collected in a pit or extracted from the return site by a vacuum pump into a holding tank [76]. Returned fluid may be further processed such as through solids extracting equipment [81] and returned to a holding tank [82] for reuse by the drill.

The rate of fluid returns and percent and size distribution of cuttings in the return fluid are used to determine if adjustments are necessary to the fluid or foam quality being pumped through the foam density control apparatus. Since in this application (soil boring) the hydrostatic pressure is typically less of a concern than the rheological properties of the foam (viscosity, cuttings carrying capacity, leak-off control, etc.), the determination whether to adjust the foam density may be based on a combination of drill pump pressures, amount of foam returning up the bore path, torque and thrust pressures, and amount of cuttings suspended in the return fluids.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. An apparatus for generating foam, comprising:

a fluid in-flow manifold in fluid communication with a source of liquid to be foamed, the fluid in-flow manifold comprising a pressure sensor in fluid communication therewith;

a plurality of branch lines in fluid communication with the fluid in-flow manifold at an inlet of each branch line and in fluid communication with a foam out-flow manifold at an outlet of each branch line, each branch line comprising a branch line flow control valve, a Venturi tube and in fluid communication with a throat of each Venturi tube an air induction control valve, the foam out-flow manifold comprising a pressure sensor in fluid communication therewith;

at least one in-flow control valve disposed between the source of liquid and the in-flow manifold; and at least one out-flow control valve in fluid communication with the fluid out-flow manifold, whereby the branch line flow control valve on each branch line, the air induction control valve on each branch line, the at least one in-flow control valve and the at least one out-flow control valve are operable to provide a chosen flow rate of the liquid into the in-flow manifold, a selected foam product flow rate out of the out-flow manifold and a selected density of the foam product.

2. The apparatus of claim 1 wherein each Venturi tube is disposed in a housing such that the Venturi tube is replaceable.

3. The apparatus of claim 2 wherein at least one Venturi tube has at least one of a different inlet diameter, a different throat diameter and a different outlet diameter than at least one other Venturi tube.

4. The apparatus of claim 2 wherein a number of the plurality of branch lines is between two and ten.

5. The apparatus of claim 4 wherein the number of branch lines is six.

6. The apparatus of claim 1 wherein the branch line flow control valve on each branch line, the air induction control valve on each branch line, the at least one in-flow control valve and the at least one out-flow control valve comprise variable flow restriction valves.

7. The apparatus of claim 1 further comprising a check valve in an air inlet line coupled to each air induction control valve.

* * * * *